United States Patent [19]

Kammlott et al.

[11] 3,833,396

[45] Sept. 3, 1974

[54] PATTERN DELINEATION METHOD AND PRODUCT SO PRODUCED

[75] Inventors: Guenther Wilhelm Kammlott, Watchung; William Robert Sinclair, Summit, both of N.J.

[73] Assignee: Bell Telephone Laboratories Incorporated, Murray Hill, N.J.

[22] Filed: May 9, 1973

[21] Appl. No.: 358,729

[52] U.S. Cl. .......................... 117/8.5, 96/38.3, 148/6, 204/157.1 R, 204/157.1 H, 96/92, 117/93.3, 96/35

[51] Int. Cl. .......................... G03c 5/00

[58] Field of Search .......................... 204/157.1 R, 157.1 H; 96/35, 36, 38.3; 148/6; 117/8, 93.3

[56] References Cited

UNITED STATES PATENTS

| | | | |
|---|---|---|---|
| 3,445,356 | 5/1969 | Beutner et al. | 204/157.1 R |
| 3,637,379 | 1/1972 | Hallman et al. | 204/157.1 R |
| 3,681,227 | 8/1972 | Szupillo | 96/38.3 |
| 3,695,908 | 10/1972 | Szupillo | 96/38.3 |

*Primary Examiner*—Ronald H. Smith
*Assistant Examiner*—Edward C. Kimlin
*Attorney, Agent, or Firm*—G. S. Indig

[57] ABSTRACT

A process for the fabrication of a supported iron oxide pattern involves selective electron irradiation of a blank. The blank consists of a layer of iron oxide which is soluble, for example, in an acidic media. Irradiation results in insolubilization so that delineation is accomplished by immersing the processed blank in a suitable solvent.

8 Claims, 3 Drawing Figures

PATTERN DELINEATION METHOD AND PRODUCT SO PRODUCED

BACKGROUND OF THE INVENTION

1. Field of the Invention

The invention is concerned with the fabrication of supported films of primary interest for use as masks or resists in the fabrication of printed circuitry.

2. Description of the Prior Art

Recently developed technology concerned with the fabrication of printed circuits involves the use of supported films of iron oxide. Patterns formed of such films are already in extensive pilot use as hard copy photomasks for defining regions of photosensitive resist materials to be irradiated by conduct or projection printing. Some aspects of this development are described in 120, *Journal of the Electrochemical Soc.*, page 545, (April 1973). Other relevant references include: 118, *J. Electrochem. Soc.*, 341 (1971), and 118, *J. Electrochem. Soc.*, 776 (1971).

Iron oxide films, properly constituted, are preferable to earlier used materials, such as conventional photographic emulsions, simply because of their improved hardness and abrasion resistance. This consideration alone, which results in substantially increased life, is sufficient to justify their use.

A special advantage of such iron oxide arises from its relatively high transparency in regions of the visible spectrum. Such material is sufficiently opaque to be usable with the relatively short wavelength ultra-violet radiation necessary for defining conventional photoresist materials. Transparency in the visible permits use as a "see through" mask, thereby permitting registration with circuit details generated during preceding delineation steps. This is of particular significance for the very small high resolution circuits which are now evolving, and workers in the field generally consider the iron oxide pattern a satisfactory procedure.

As described in the references cited, fabrication of an iron oxide pattern, whether in the form of a mask or otherwise, depends upon the soluble nature of the film. This soluble nature, generally traced to the amorphous nature of the film as determined by X-ray diffraction, is conveniently defined as sufficient to result in removal of a 1 $\mu$M thick film in 6N HC1 in one hour at room temperature. This solubility permits delineation by conventional photoresist methods which entail depositing a layer of photoresist either positive or negative and selectively irradiating portions to be removed or retained in a subsequent dissolution step. Delineation is then accomplished by immersion, for example, in suitable acidic media.

SUMMARY OF THE INVENTION

In accordance with the present invention, pattern delineation is accomplished by insolubilization of an otherwise soluble iron oxide film. Insolubilization is accomplished by irradiation with electrons sufficiently accelerated to penetrate to the film-substrate interface. Actual pattern formation thereafter results from the simple immersion or, more generally, the wetting of the entire film in a suitable solvent. Solvents which differentiate between irradiated and unirradiated portions of the film are diverse and include the aqueous HC1 solution commonly utilized in iron oxide delineation procedures involving photoresists.

The preferred embodiment contemplates use of a programmed electron beam so that masks and resists are avoided in the delineation process. The insolubilization results, however, by use of electrons of proper energy level whether focused or not. Procedures involving electron flooding or even focused beams where delineation is accomplished by means of a resist or mask or included within the inventive concept.

DETAILED DESCRIPTION

1. Nature of the Unprocessed Film

Figure 1:
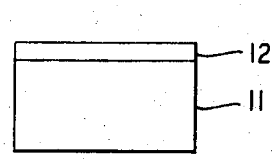
FIG. 1 is a front elevational view of an unprocessed blank consisting of a soluble iron oxide layer on a substrate.
Figure 2:
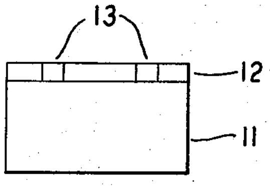
FIG. 2 is a front elevational view of the structure shown in FIG. 1 after selective irradiation in accordance with the invention.
Figure 3:
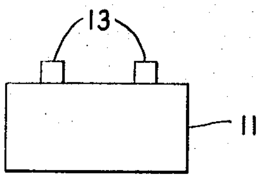
FIG. 3 is a front elevational view in cross section of the structure shown in FIGS. 1 and 2 after removal of the unirradiated portions of the iron oxide layer.

The inventive process is dependent upon insolubilization of an iron oxide film, such as, film 12 of FIG. 2. It is, therefore, an implicit requirement of the invention that the film before processing evidences a required degree of solubility. This implicit requirement applies regardless of the manner in which the oxide film is produced.

Suitable procedures for preparation of oxide films are described in the references noted in the prior art section. Soluble films have been prepared by chemical vapor deposition from iron-containing compounds, such as, iron carbonyl; and, in fact, blanks prepared by this procedure are now commercially available. Suitable films have also been prepared by sputtering, for example, in an atmosphere containing carbon monoxide. A recently developed procedure is described in copending application Ser. No. 358,728 filed 12/12/72 (L. F. Thompson Case 4). This procedure involves the oxidative breakdown of polyvinyl ferrocene or similar material which is ordinarily applied to the substrate in the form of a solution.

It is common practice to describe the soluble oxide film as "$Fe_2O_3$" and this practice is generally followed in the present description. There is, however, experimental basis indicating that the film is of somewhat more complex composition, and, in fact, that it may vary to some degree depending upon the procedure used for its preparation. For example, it has been noted that, under certain circumstances, the oxidized film contains considerable amounts of carbon. Under usual circumstances, this carbon is present in the compound $Fe(CO_3)_2$. Such inclusion is common where films are prepared from carbonyl or by low temperature oxidation of polyvinyl ferrocene (380° C or less). Some workers have been postulated that the carbonate content of the film contributes to its solubility; and in substantiation, it has been observed that $CO_2$ is sometimes liberated during the insolubilization process. However, soluble oxide films have been prepared under circumstances where carbonate content is not detectably present. For example, the same oxidation procedure for preparation of the film using polyvinyl ferrocene at temperatures above about 380° C (but below some maximum of approximately 420° C) results in suitably soluble oxide films with little or no evidence of carbonate content. Processing of soluble films, however prepared, at temperatures of 380° C or above may result in liberation of $CO_2$ without rendering the films insoluble.

Regardless of the manner in which the oxide film is produced, it is considered proper to characterize it as "amorphous". It has been found that neither X-ray nor electron beam diffracton analysis reveals long-range ordering over distances of 50 Angstrom units or greater. It has been uniformly found that films characterized as amorphous within these indicated limits are sufficiently soluble to permit operation of the inventive process.

The essential requirement of solubility is here defined as disappearance of a film of a thickness of $1\mu m$ in a period of one hour or less when wetted by aqueous 6N HC1 when maintained at room temperature.

This particular reagent, while conveniently utilized as a standard for the purpose of this definition and while quite suitable for practice of the invention, is merely exemplary of a large class of appropriate etching media. In fact, irradiation of oxide films prepared in accordance with the invention are rendered at least an order of magnitude less soluble in virtually all etchants for the unprocessed film. Film thickness is a parameter which may be varied to suit the particular requirements of both pattern delineation and ultimate use. The invention does not depend upon film thickness—any feasible thickness may be insolubilized by irradiation to result in selective retention in an appropriate etchant. While there are, in consequence, no strict limits on thickness, film continuity is assured by thicknesses of the order of 500 Angstroms or even less and thicknesses of approximately $2\mu m$ are sufficient for presently contemplated needs. These limits, therefore, prescribe a probable working range.

2. Irradiated Material

Irradiated film or portions are generally in whole or in part characterized by the structure of $\alpha$ $Fe_2O_3$. Under certain circumstances, where conditions are such that there is significant loss of oxygen, some part of the material may be converted to $Fe_3O_4$. For example, such loss may result in irradiated films containing as much as fifty percent by weight $Fe_3O_4$. The essence of the invention does not reside in the particular chemical composition or crystallographic nature of the irradiated film but rather in the observation that irradiation, when carried out under the conditions noted, results in sufficient differentiation in terms of solubility as compared to unirradiated portions to permit pattern delineation by immersion or other wetting of the entire film.

A significant advantage of the prior art masks using iron oxide is sufficient transparency of the film for visible light to permit registration with any underlying detail. This characteristic is particularly useful for very small high resolution circuits prepared by contact printing. In projection printing, the "see through" characteristic may not be so important, and automation even of contact printing processes may ultimately result in less emphasis on transparency. Iron oxide is a valuable material both for mask and resist use at least in part because of its excellent physical characteristics—e.g., abrasion resistance.

Whatever the value, crystallized material resulting from irradiation in accordance with the invention, while of somewhat altered absorption characteristics in the visible spectrum, continues to be sufficiently transparent to permit use as a "see throught" mask.

3. Substrate

A detailed discussion of substrate requirements is not appropriate to this description. Substrates are generally selected on the basis of intended use and this, in turn, requires that they be capable of withstanding whatever conditions are encountered during processing. For see through mask use, substrate material must, of course, be sufficiently transparent to permit visual alignment. Mask use generally requires transparency sufficient to pass whatever radiation is to be passed. (For usual photoresists, this requires transparency in the near UV spectrum.) Exemplary materials for see through mask use are fused silica, sapphire, and mixed oxide glasses, such as, borosilicates, etc. Where the oxide film is used as a resist, the substrate is, of course, the article being processed. This may constitute a simple or composite surface including such diverse materials as silicon, silica, tantalum oxide or nitride and a variety of metals, such as, titanium, platinum, gold, tantalum, etc.

4. Processing

The most critical parameter for electron beam irradiation is penetration depth. Adhesion of insolubilized portions during development is dependent upon conversion of the oxide material at the film-substrate interface. If the accelerating voltage is inadequate to result in this penetration, the film at the interface will be dissolved, and the insolubilized portion will lift during etching.

The precise relationship between film thickness and penetration depth as related to accelerating voltage is specified by the following formula:

$$Z = (0.046/\rho)\ V_a\ 1.75, \qquad 1.$$

where Z is film thickness in micrometers; $\rho$ is density in $g/cm^3$; (about 5 for oxide material of concern) $V_a$ is the accelerating voltage in kilovolts.

Assuming an appropriate electron velocity, it is next required that the integrated work be sufficient to bring about insolubilization. Based on a series of experiments, for example, comparing absorption spectra, it is fairly well established that the effect of electron irradiation is merely that of crystallization accompanying local attainment of sufficiently high film temperature. Minimum required temperature is generally about 420° C. This required level persists, in general, regardless of the manner in which the soluble film was deposited. So, for example, it has been observed that under certain circumstances significant quantities of $CO_2$ are evolved during delineation thereby indicating the presence of carbonate in the soluble film. Under vacuum conditions necessary for electron irradiation, there is expected also to be some loss of oxygen so resulting in some $Fe_3O_4$ in the film. None of these variations has any apparent effect on the approximate work required to insolubilize or on the properties of the developed film.

Insolubilization is, in the final analysis, dependent upon a number of processing conditions. A significant parameter in this respect is the background temperature of the film; and so it has been found that scan rates for programmed electron beams of given intensity may be significantly increased by maintaining the film at some elevated temperature, for example, up to about 400° C. Higher temperature e.g., up to about 420° C may be tolerated for periods of up to about 5 hours without appreciable insolubilization.

Attainment of a given temperature level is required for insolubilization, other factors affecting heat loss are elemental. For example, substrate reflectivity, film thickness, and thermoconductivity of both substrate and film all have some effect. In general, at room temperature operation utilizing a film of the order of 2,000 Angstrom units in thickness, insolubilization is produced by an integrated dose having a minimum value of about $5 \times 10^2$ coulombs per square centimeter. This value corresponds with a beam current density of about $5 \times 10^3$ amperes per square centimeter. Use of conventional tungsten filament electron sources has permitted scan rates of the order of centimeters per second for a beam of a diameter of about 1,000 Angstrom units.

In summation, accelerating voltage required for penetration is easily calculated or alternatively easily determined by simple trial. Dosage is not easily calculable. However, since transmission properties are somewhat altered during insolubilization, the process may be visibly monitored. From the economic standpoint, it is disadvantageous to use more than the minimum energy required. In addition, exceeding the level required for insolubilization of the whole film thickness by many times may result in some cracking of the insolubilized film.

Available electron sources, tungsten filament, lanthanum hexaboride, and field emission apparatus, at this time limit feasible operations to the use of a beam. Electron beam flooding, for example, through a shadow mask is not now considered a practical expedient. Use of higher density electron sources may make this type of processing feasible in the future.

To a greater extent, where the film is to be used as a resist, but where it is to be used as a mask as well, greatest resolution results where pattern delineation is brought about by direct programmed beam. The ultimate limitation on any mask process results from the spreading due to Rayleigh diffraction and other edge losses in the mask. Where the iron oxide pattern is produced by a mask process, such a limit is set by the mask used at this stage. Where the iron oxide film, itself, serves as a mask rather than as a direct resist, a limit due to the same mechanism is set at this stage. In general, edge losses introduced by the iron oxide pattern used as a mask are small relative to some other mask materials due to feasibility of use of thin films; this, in turn, is due in part to the excellent contrast afforded by the film at short wavelengths. The ability to deposit and process continuous films, for example, to 200 Angstrom units or less depending on the deposition technique, suggests less edge loss than for emulsion films, which are usually thicker.

Films processed in accordance with the invention have sufficient transparency at least at some wavelength in the visible spectrum, to permit "see-through" mask use. The actual form of the spectrum of the soluble film has been only insignificantly changed during processing. Films produced by oxidative breakdown of polyvinyl ferrocene continue to show their relatively gradual decrease in transparency in the direction of short wavelength in the visible spectrum, but show somewhat reduced transparency in the yellow. Films produced by chemical vapor deposition show a relatively sharp increase in transparency in the same direction within the visible spectrum after irradiation and, in certain instances, have somewhat increased transparency in the yellow. All films processed in accordance with the invention are sufficiently transparent to permit visual alignment under feasible commercial fabrication conditions.

Actual development of the processed film whether delineated by a programmed beam or by the use of a mask is accomplished in the manner set forth in, for example, 120, *Journal of the Electrochemical Society*, 545 (April 1973). Soluble iron oxide has been defined in this description in terms of 6N HCl. Insolubilization is sufficient to render the development process noncritical. Periods many times greater than that required to remove soluble films in a variety of etching media result in little, if any, perceptible loss of insolubilized material. Development may be carried out at room temperature, although temperature may be varied to meet any other processing demands.

5. Examples

A. The soluble oxidized film was produced by oxidation of high molecular weight polyvinyl ferrocene which had been applied by spinning in a benzene solvent on a fused silica substrate. The soluble oxide was about 2,000 Angstrom units thick. Delineation was carried out using a tungsten filament electron beam source with beam characteristics: 10Kv, $10^{-7}$ amperes, diameter 1,000 Angstrom units. The beam was scanned over the oxide film at a rate of about 0.4 centimeters per second. Following irradiation, the film was immersed in 6N HCl at room temperature for a period of about 3 minutes. Substrate and coating were then rinsed and dried. Resolution of the pattern was better than $1\mu m$.

B. The blank consisted of a 3,000 Angstrom units thick soluble iron oxide deposited on a glass substrate by chemical vapor deposition from iron pentacarbonyl. A programmed electron beam again produced by a tungsten filament source was caused to scan the blank at about 25 centimeters per second. Accelerating voltage was again about 10 Kv and current was about $4 \times 10^{-7}$ amperes. The resultant pattern after development, as in Example A, had a line width of about $1.5\mu m$ with a resolution, again, better than about $1\mu m$.

C. Procedures of Example B were followed, however, utilizing an accelerating voltage of 20 Kv. Results were generally similar, but some spreading of the delineated line to a thickness of $2.0\mu m$ resulted.

D. The procedures of Example C were repeated with beam current reduction to about $2 \times 10^{-7}$ amperes using a scan rate of 100 mm per second. Line width of the developed pattern was about $1.0\mu m$.

E. A resist pattern was produced in a soluble oxide film of a thickness of about 3,000 Angstrom units on a silicon wafer having a 2,000 Angstrom units thick thermally produced silicon oxide passivating film. Beam characteristics were 20 Kv, acceleration $4 \times 10^{-7}$ amperes, scan rate of 250 mm per second. The resultant pattern evidenced a line width of about $1.5\mu m$.

What is claimed is:

1. Procedure for the fabrication of a substrate supported pattern delineated film of a film composition comprising oxidized iron in accordance with which portions of a continuous film comprising oxidized iron are removed by dissolution in a solvent, said film before pattern delineation being sufficiently soluble such that a film thickness of one micrometer is removed by dissolution in an aqueous solution of 6N HCl in an hour at room temperature, characterized in that the said unprocessed film is pattern delineated by selective irradiation of portions of such film by electrons accelerated at a voltage sufficient to produce substantial penetration of the entire thickness of such film so as to render such irradiated portions relatively insoluble with the portions irradiated corresponding with the desired pattern delineation, and in that selective removal is accomplished by wetting the entire film with a solvent so as to remove unirradiated film thereby retaining the desired pattern delineated film.

2. Procedure in accordance with claim 1 in which the film thickness is from 500 Angstrom units to about 1 $\mu$m and in which the accelerating voltage is of a value approximating that of $V_a$ in the following equation:

$Z = (0.046/\rho\ V_a\ 1.75,$ where Z is film thickness in micrometers; $\rho$ is density in g/cm$^3$; $V_a$ is the accelerating voltage in kilovolts.

3. Procedure of claim 1 in which the accelerated electrons define a beam and in which irradiation of successive portions of the said film results from scanning the film with the said beam.

4. Procedure of claim 3 in which the current density of the said beam is at least $5 \times 10^3$ amperes per square centimeter and in which the work product in the said film resulting from irradiation is at least $2 \times 10^{-2}$ coulombs per square centimeter.

5. Procedure of claim 3 in which the substrate is unheated by means distinguishable from the electron irradiation and in which the minimum work product in the portions of the said film is at least $5 \times 10^{-2}$ coulombs per square centimeter.

6. Procedure of claim 1 in which the substrate is maintained at an elevated temperature during irradiation.

7. Procedure of claim 6 in which the substrate is maintained at a temperature of up to about 400° C.

8. Product produced in accordance with the procedure of claim 1.

* * * * *

UNITED STATES PATENT OFFICE
CERTIFICATE OF CORRECTION

Patent No. 3,833,396 Dated September 3, 1974

Inventor(s) Guenther W. Kammlott and William R. Sinclair

It is certified that error appears in the above-identified patent and that said Letters Patent are hereby corrected as shown below:

Column 1, line 16, change "conduct" to read --contact--.

Column 2, line 39, change "December 12, 1972" to read --May 9, 1973--;

line 58, change "been" to read --even--.

Column 3, line 8, change "diffracton" to read --diffraction--.

Column 4, line 2, change "throught" to read --through--.

Signed and sealed this 14th day of January 1975.

(SEAL)
Attest:

McCOY M. GIBSON JR.
Attesting Officer

C. MARSHALL DANN
Commissioner of Patents

FORM PO-1050 (10-69)
USCOMM-DC 60376-P69
☆ U.S. GOVERNMENT PRINTING OFFICE : 1969 O—366-334.